(12) United States Patent
Akamine et al.

(10) Patent No.: US 9,180,848 B2
(45) Date of Patent: Nov. 10, 2015

(54) VEHICLE BRAKE FORCE GENERATION DEVICE

(71) Applicant: HONDA MOTOR CO., LTD., Minato-Ku, Tokyo (JP)

(72) Inventors: Kohei Akamine, Wako (JP); Masayuki Ueno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/415,188

(22) PCT Filed: Jul. 16, 2013

(86) PCT No.: PCT/JP2013/069313
§ 371 (c)(1),
(2) Date: Jan. 16, 2015

(87) PCT Pub. No.: WO2014/013991
PCT Pub. Date: Jan. 23, 2014

(65) Prior Publication Data
US 2015/0191159 A1    Jul. 9, 2015

(30) Foreign Application Priority Data
Jul. 19, 2012   (JP) ................................. 2012-161010

(51) Int. Cl.
*B60L 9/00* (2006.01)
*B60T 8/1761* (2006.01)
*B60T 8/1755* (2006.01)
(Continued)

(52) U.S. Cl.
CPC .............. *B60T 8/17616* (2013.01); *B60L 7/18* (2013.01); *B60T 7/042* (2013.01); *B60T 8/1755* (2013.01); *B60T 2270/402* (2013.01); *B60T 2270/604* (2013.01); *Y10S 903/947* (2013.01)

(58) Field of Classification Search
USPC .......................................................... 701/22
See application file for complete search history.

(56) References Cited

U.S. PATENT DOCUMENTS

| | | | |
|---|---|---|---|
| 6,629,026 B1 * | 9/2003 | Baraszu | B60K 6/48 180/65.25 |
| 8,886,375 B2 | 11/2014 | Yuki | |
| 2001/0038240 A1 * | 11/2001 | Yoshida | B60T 7/042 303/28 |

(Continued)

FOREIGN PATENT DOCUMENTS

| | | |
|---|---|---|
| JP | H10-203334 A | 8/1998 |
| JP | 2010-247782 A | 11/2010 |

(Continued)

*Primary Examiner* — Hussein A. Elchanti
(74) *Attorney, Agent, or Firm* — Carrier Blackman & Associates, P.C.; Joseph P. Carrier; William D. Blackman (57) ABSTRACT

A vehicle brake force generation device is provided with an electric motor for applying drive force and regenerative brake force to the wheels of an electric vehicle, a brake hydraulic pressure generation device for generating the brake hydraulic pressure to be applied to the calipers of the electric vehicle, a slip information computation unit for computing the slip information of the wheels, a VSA device for controlling the friction braking of at least the brake hydraulic pressure generation device such that the slipping of the wheels is inhibited, a first diagnosis unit for diagnosing the VSA device, and a brake control unit for controlling the cooperative braking which includes controlling the regenerative braking of the electric motor and/or controlling the friction braking of the brake hydraulic pressure generation device.

5 Claims, 4 Drawing Sheets

(51) Int. Cl.
*B60L 7/18* (2006.01)
*B60T 7/04* (2006.01)

(56) References Cited

U.S. PATENT DOCUMENTS

| | | | |
|---|---|---|---|
| 2003/0183431 A1* | 10/2003 | Cikanek | B60K 6/48 180/65.6 |
| 2004/0207257 A1* | 10/2004 | Faye | B60T 7/12 303/125 |
| 2006/0004509 A1* | 1/2006 | Teslak | B60K 6/12 701/84 |
| 2006/0258508 A1* | 11/2006 | Tanioka | B60R 25/04 477/203 |
| 2008/0177434 A1* | 7/2008 | Moran | B60K 6/12 701/22 |
| 2009/0115247 A1* | 5/2009 | Leiber | B60T 7/042 303/154 |

FOREIGN PATENT DOCUMENTS

| | | |
|---|---|---|
| JP | 2011-183822 A | 9/2011 |
| JP | 2012-126352 A | 7/2012 |

* cited by examiner

VEHICLE BRAKE FORCE GENERATION DEVICE

TECHNICAL FIELD

The present invention relates to a vehicle brake force generation device for generating brake force for a vehicle.

BACKGROUND ART

For a hybrid vehicle, for example, in addition to an existing brake system for generating a brake force through a hydraulic circuit, a by-wire brake system for generating a brake force through an electric circuit is adopted. In such a by-wire brake system, the operation amount of a brake pedal by a driver is converted into an electrical signal to be provided to an electric motor for driving a piston of a slave cylinder (hereinafter, referred to as an "electric servo brake system"). Then, a hydraulic brake pressure is generated by compressive driving of the piston by the electric motor to be applied to the electric servo brake system. Thus generated hydraulic brake pressure operates wheel cylinders to generate brake forces caused by friction.

In addition to the control of the friction braking caused by an electric servo brake system, the control of the regenerative braking caused by a wheel driving electric motor is performed in such a by-wire brake system. A wheel driving electric motor is used as an electric power generator in the control of the regenerative braking caused by a wheel driving electric motor, wherein a brake force is generated by a regenerative torque generated by the wheel driving electric motor.

Further, conventionally, in order to obtain a brake force corresponding to the operation amount of a brake pedal by a driver, a technology is known that performs control integrating the control of regenerative braking caused by a wheel driving electric motor and the control of friction braking caused by an electric servo brake system. The recovery efficiency of kinetic energy can be increased by this integrated brake control technology.

Among by-wire brake systems to which the above-described integrated brake control technology is applied, known is one provided with an ABS (Antilock Brake System) having a function to avoid a locked state of wheels in braking a vehicle (see Patent Literature 1). In the brake force control technology according to Patent Literature 1, the behavior of the vehicle is estimated, based on a signal from a wheel speed sensor, an acceleration sensor, and the like, and based on a result of this estimation, brake forces applied to the wheels are controlled so as to stabilize the behavior of the vehicle.

In detail, in the brake force control technology according to Patent Literature 1, if the result of a diagnosis of the ABS is normal, it is determined whether or not ABS control is to be executed based on the slip ratios of the wheels, and torque control of a wheel driving electric motor is performed, based on the operational state of the ABS according to this result of determination. Concretely, an electric motor for driving wheels is controlled to be in a power running state when ABS control is performed, and is controlled to be in a regenerative state when ABS control is not performed.

On the other hand, if the diagnosis result of the ABS is abnormal, the wheel driving electric motor is immediately prohibited from being controlled in the regenerative brake control state and is controlled to be in the power running state.

In brief, in the brake force control technology according to Patent Literature 1, if a diagnosis result of the ABS is abnormal, the wheel driving electric motor is subjected to drive control so as to avoid locking of the wheels caused by erroneous regenerative braking.

Thus, in the brake force control technology according to Patent Literature 1, the wheel driving electric motor can be appropriately controlled to stabilize the behavior of the vehicle.

RELATED ART DOCUMENT

Patent Literature

Patent Literature 1: JP 2010-247782 A

DISCLOSURE OF THE INVENTION

Problems to be Solved by the Invention

However, in the brake force control technology according to Patent Literature 1, if the diagnosis result of the ABS is abnormal, the control of the regenerative braking caused by the wheel driving electric motor is immediately prohibited. Consequently, it may occur that the driver comes to have a strange feeling caused by braking derived from a sudden change in the brake force due to a sudden stoppage of regenerative brake control, and the amount of electricity obtained by regenerative braking may decrease.

The present invention has been developed in order to solve the above-described problems, and an object of the present invention is to obtain a vehicle brake force generation device capable of giving a satisfactory braking feeling to a driver and gaining the amount of electricity obtained from regenerative braking.

Means for Solving the Problems

In order to achieve the above-described object, a vehicle brake force generation device in a first aspect (1) of the invention includes: an electric motor for applying a drive force and a regenerative brake force to a wheel of a vehicle; a hydraulic brake pressure generation device for generating a hydraulic brake pressure to be applied to a brake member of the vehicle; a slip information computation section for obtaining slip information of the wheel; a behavior-stabilization assistance device for performing control of friction braking caused by at least the hydraulic brake pressure generation device so as to reduce slip of the wheel, based on the slip information; a diagnosis section for performing diagnosis of the behavior-stabilization assistance device; and a brake control section for performing cooperative brake control including at least one of the control of the regenerative braking caused by the electric motor and the control of the friction braking caused by the hydraulic brake pressure generation device.

In aspect (1) of the invention, if the brake control section has obtained diagnosis information during the cooperative brake control including at least the control of the regenerative braking caused by the electric motor, the diagnosis information representing that the behavior-stabilization assistance device is in an abnormal state, then the brake control section maintains the state of the control of the regenerative braking caused by the electric motor.

According to aspect (1) of the invention, when, for example, the ABS of the behavior-stabilization assistance device is in an abnormal state, a satisfactory braking feeling can be given to the driver compared with a case of performing control that prohibits regenerative braking caused by the electric motor. Further, as the kinetic energy of the vehicle can be recovered by conversion into electric energy, an electricity amount obtained by regenerative braking can be gained.

In aspect (2) of the invention, the vehicle brake force generation device according to aspect (1) of the invention further includes: a drive control section for performing drive control of the electric motor, based on acceleration/deceleration operation information of the vehicle; and an information communication medium used in performing information communication between the brake control section and the drive control section.

In aspect (2) of the invention, arrangement may be made such that the diagnosis section further has a function to perform abnormality diagnosis of the information communication performed via the information communication medium, and if the brake control section has obtained diagnosis information during the cooperative brake control including at least the control of the regenerative braking caused by the electric motor, the diagnosis information representing that information communication on the cooperative brake control performed between the brake control section and the drive control section to reduce the slip of the wheel is abnormal, then the brake control section maintains the state of the control of the regenerative braking caused by the electric motor.

By aspect (2) of the invention, as the state of the control of the regenerative braking caused by the electric motor is maintained, for example, in a case that some abnormality of information communication on the cooperative brake control (including the abnormality of the information communication medium) has occurred, it is possible to individually and concretely manage a case of maintaining the state of the control of the regenerative braking caused by the electric motor, in addition to the above-described operation and advantage achieved in aspect (1) of the invention.

Further, in aspect (3) of the invention, arrangement may be made such that the diagnosis section further has a function to perform abnormality diagnosis of the information communication performed via an information communication medium, and if the brake control section has obtained diagnosis information during the cooperative brake control including at least the control of the regenerative braking caused by the electric motor, the diagnosis information representing that the information communication on the cooperative brake control performed between the brake control section and a drive control section to reduce the slip of the wheel is abnormal and representing that the behavior-stabilization assistance device is in an abnormal state, then the brake control section maintains the state of the control of the regenerative braking caused by the electric motor.

By aspect (3) of the invention, the state of the control of the regenerative braking caused by the electric motor is maintained, for example, in a case that some abnormality of the information communication medium has occurred and the behavior-stabilization assistance device is in an abnormal state. Accordingly, it is possible to individually and concretely manage a case of maintaining the state of the control of the regenerative braking caused by the electric motor, in addition to the above-described operation and advantage achieved by aspect (1) of the invention.

Still further, in aspect (4) of the invention, arrangement may be made such that the diagnosis section further has a function to perform abnormality diagnosis of the information communication performed via the information communication medium, wherein if the brake control section has obtained diagnosis information during the cooperative brake control including at least the control of the regenerative braking caused by the electric motor, the diagnosis information representing that information communication on the cooperative brake control, which is performed between the brake control section and the drive control section to reduce the slip of the wheel, is normal and representing that the behavior-stabilization assistance device is in normal operation, then the brake control section gradually decreases the control amount of regeneration braking caused by the electric motor.

By aspect (4) of the invention, for example, in a case that the information communication medium is normal and the behavior-stabilization assistance device is in normal operation (for example, one or more conditions of the "ABS being in operation", the "EDC system being in operation", and "early stoppage of regeneration being currently requested" are satisfied), the control amount of the regeneration braking caused by the electric motor is gradually decreased so that, in addition to the above-described operation and advantage of aspect (1) of the invention, it is possible to improve the behavior-stabilization performance obtained by the behavior-stabilization device.

In aspect (5) of the invention, the vehicle brake force generation device described in aspect (4) may be arranged such that the brake control section makes the control amount of the regeneration braking caused by the electric motor gradually decrease down to zero and thereafter maintains the state that the control amount is zero.

By aspect (5) of the invention, the control amount of the regeneration braking caused by the electric motor is gradually decreased to thereby become zero and the control amount in a state of zero is thereafter maintained. Accordingly, it is possible to further improve the behavior-stabilization performance obtained by the behavior-stabilization assistance device, compared with the above-described operation and advantage by aspect (4) of the invention.

Advantage of the Invention

A vehicle brake force generation device according to the present invention can give a satisfactory braking feeling to a driver and gain the amount of electricity obtained by regenerative braking.

EMBODIMENTS FOR CARRYING OUT THE INVENTION

In the following, vehicle brake force generation devices according to embodiments of the present invention will be described in detail, referring to the drawings.

[Example of Applying Vehicle Brake Force Generation Device 11 According to Embodiments of the Invention to Electric Vehicle V]

Figure 1:
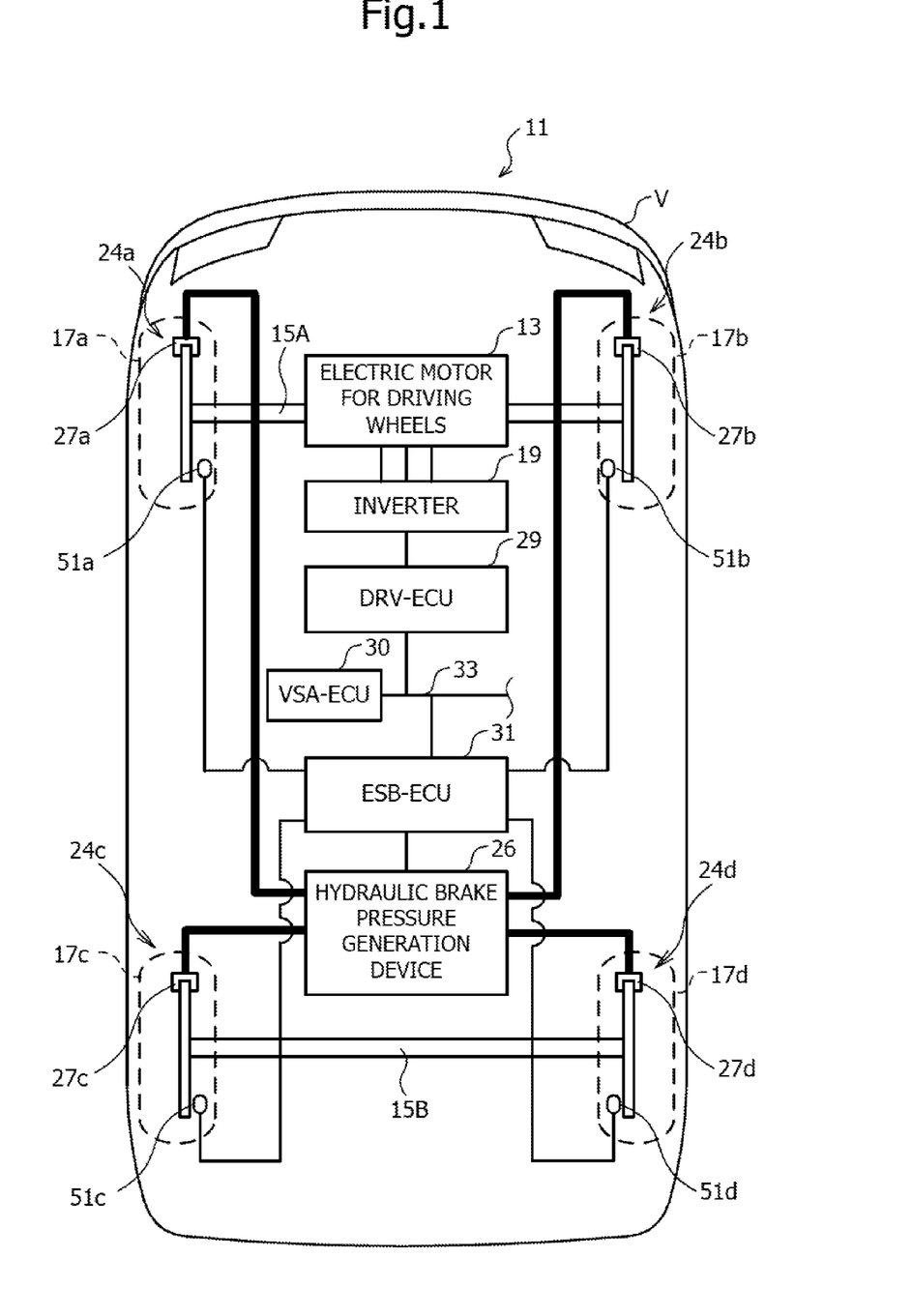
FIG. 1 is a diagram showing an example where a vehicle brake force generation device according to an embodiment of the present invention is applied to an electric vehicle.

First, an example of applying a vehicle brake force generation device 11 according to an embodiment of the present invention to an electric vehicle V will be described, referring to FIG. 1. FIG. 1 is a diagram showing an example where the vehicle brake force generation device 11 according to an embodiment of the present invention is applied to the electric vehicle V.

Prior to description of an embodiment of the present invention, the symbol rule of assigning symbols used for the convenience of description will be described. As the vehicle brake force generation device 11 according to an embodiment of the present invention is mounted, for example, on a four-wheel electric vehicle V, common members may be provided to the respective four wheels. In this case, a common symbol is assigned to common members, wherein added are a suffix a to the symbols of members provided at the wheel on the front-left side with respect to the movement direction, a suffix b to the symbols of members provided on the wheel on the front-right side, a suffix c to the symbols of members provided on the wheel on the rear-left side, and a suffix d to the symbols of members provided on the wheel on the rear-right side. Further, when common members are referred to in general, a suffix may be omitted.

As shown in FIG. 1, an electric motor 13 for driving wheels is provided on the electric vehicle V (corresponding to the "vehicle" in the invention) on which the vehicle brake force generation device 11 according to an embodiment of the invention is mounted. A front wheel drive shaft 15A is connected to the electric motor 13 through a moving power transmission mechanism, not shown. Wheels (front wheels) 17a, 17b are provided at the respective ends of the front wheel drive shaft 15A. Likewise, wheels (rear wheels) 17c, 17d, which are driven wheels, are provided at the respective ends of a rear wheel drive shaft 15B.

A drive control section 45 (see FIG. 2A) of a DRV-ECU 29, which is a later-described drive control ECU (Electronic Control Unit), controls the electric motor 13 to be in a power running state to thereby use the electric motor 13 as an electric motor having an original purpose, and thus has a function to make the electric motor 13 output a power running torque. As a result, the electric motor 13 acts so as to drive the wheels 17a, 17b.

Further, the drive control section 45 (see FIG. 2A) of the DRV-ECU 29 controls the electric motor 13 to be in the regenerative state to thereby use the electric motor 13 as an electric power generator with a purpose different from the original purpose, and thus has a function to make the electric motor 13 output a regenerative torque. As a result, the electric motor 13 acts so as to brake the wheels 17a, 17b.

An onboard battery, not shown, functioning as an electric power source of the electric motor 13 is mounted on the electric vehicle V. As the onboard battery, for example, a lithium-ion secondary battery can be suitably used.

As shown in FIG. 1, the electric motor 13 is connected to an inverter 19. The inverter 19 is connected to the above-described onboard battery through a current carrying cable, not shown. The inverter 19 converts DC power from the above-described onboard battery into AC power, while having a function to convert the regenerative power (AC power) of the electric motor 13 into DC power.

Concretely, in using the electric motor 13 as an electric motor for the original purpose, DC power from the above-described onboard battery is converted by the inverter 19 into AC power, and this AC current is supplied to the electric motor 13. On the other hand, in using the electric motor 13 as a power generator, regenerative power (AC power) from the electric motor 13 is converted by the inverter 19 into DC power, and this DC power is supplied to the above-described onboard battery. Further, by controlling the current value or the frequency of the AC power, using the inverter 19, it is possible to control the torque and the rotation speed of the electric motor 13.

The electric vehicle V is provided with friction brake devices 24a-24d for braking respective plural wheels 17a-17d. These friction brake devices 24a-24d are configured including a hydraulic brake pressure generation device 26 for generating a hydraulic brake pressure corresponding to the operation amount of depressing a brake pedal 23 (see FIG. 2A) by a driver, and calipers 27a-27d for braking the plural wheels 17a-17d by the hydraulic brake pressure from the hydraulic brake pressure generation device 26. The calipers 27a-27d correspond to "brake members" in the present invention.

The hydraulic brake pressure generation device 26 is configured including a master cylinder and a slave cylinder, not shown, as disclosed, for example, by Japanese Patent Application Publication No. 2008-184057. In an embodiment of the present invention, the slave cylinder corresponds to an electrical servo brake system (ESB system) 16 (see FIG. 2A). In the ESB system 16, a hydraulic brake pressure is generated in such a manner that the electric motor (not shown) drives a piston (not shown), corresponding to the brake operation by the driver. Thus generated hydraulic brake pressure operates the calipers 27a-27d, and brake forces are thus generated by friction.

Incidentally, in the example shown in FIG. 1, a disc brake device is adopted as a friction brake device 24, however, the invention is not limited this example. As a friction brake device 24, a drum brake device may be adopted instead of a disc brake device.

In order to perform drive control of the electric vehicle V, the electric vehicle V is provided with the above-described DRV-ECU 29, as shown in FIG. 1. The DRV-ECU 29 will be described in detail later.

Further, in order to stabilize the behavior of the electric vehicle V, the electric vehicle V is provided with a VSA device (corresponding to a "behavior-stabilization assistance device" in the invention) 18 (see FIG. 2B) including a VSA (Vehicle Stability Assist; VSA is a registered trademark)—ECU 30 shown in FIG. 1. The VSA device 18 and the VSA-ECU 30 will be described later in detail.

Figure 2A:
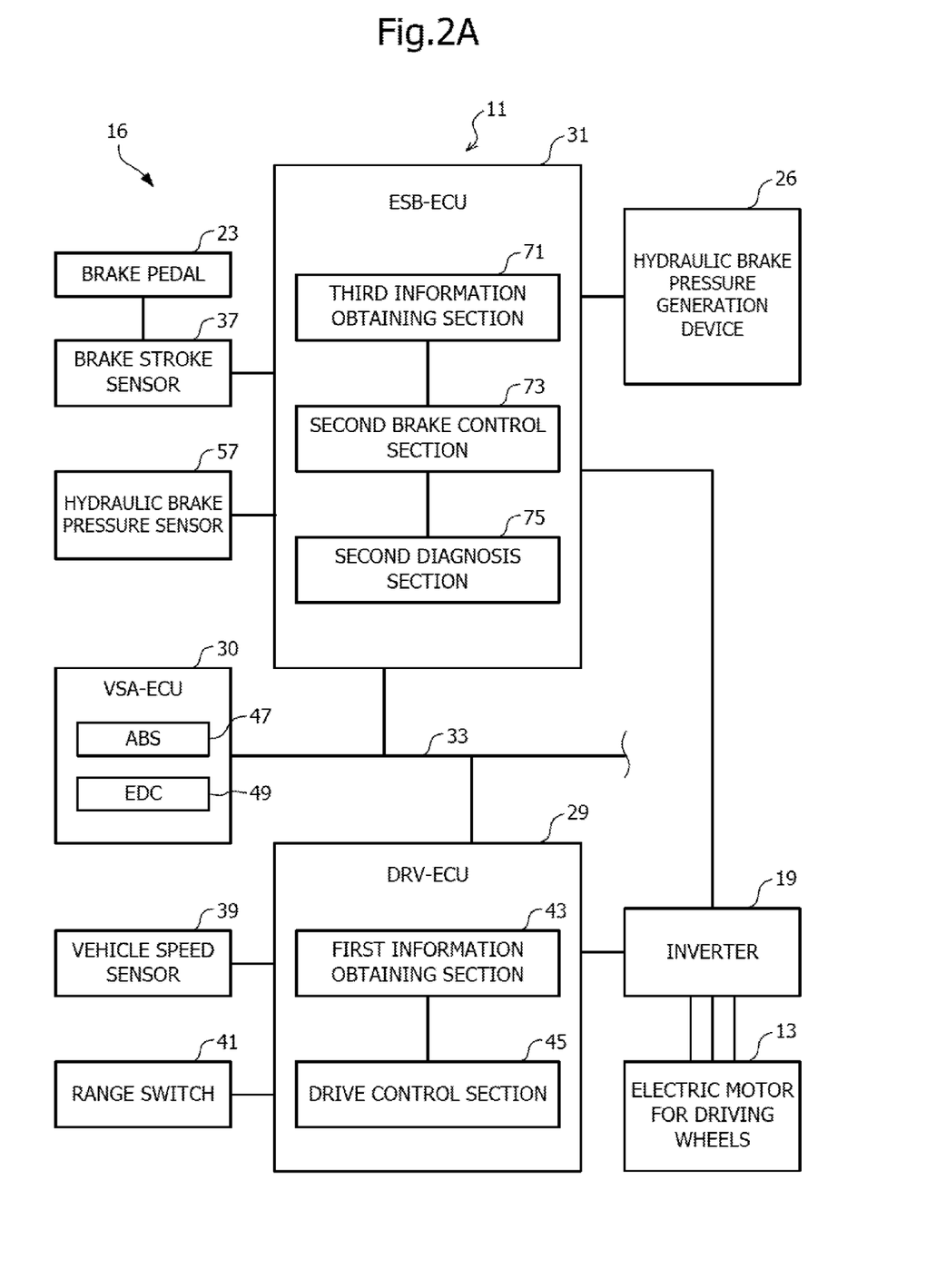
FIG. 2A is a function block configuration diagram representing the overview of the periphery of the vehicle brake force generation device according to an embodiment of the invention.

Further, in order to control the operation state of the friction brake device 24, the electric vehicle V is provided, as shown in FIG. 1, with an ESB-ECU 31 for performing control of the above-described ESB system 16 (see FIG. 2A). The ESB-ECU 31 will be described later in detail.

The DRV-ECU 29, the VSA-ECU 30, and the ESB-ECU 31 are connected with each other, being able to perform information communication as shown in FIG. 1 via, for example, the below described CAN (Controller Area Network) communication medium (corresponding to the "information communication medium" in the invention) 33.

The CAN communication medium 33 is a multiplied serial communication network used in general for a purpose of information communication between onboard devices. CAN has an excellent data transfer speed and an excellent data detection performance. However, the "information communication medium" in the invention is not limited to the CAN communication medium 33. As the "information communication medium" related to the invention, for example, "FlexRay" may be adopted.

Incidentally, for the vehicle brake force generation device 11 according to an embodiment of the present invention, in order to gain the electricity amount obtained by regenerative braking, the control of regenerative braking caused by the electric motor 13 is applied prior to the control of friction braking caused by the hydraulic brake pressure generation device 26. Herein, "The control of the regenerative braking caused by the electric motor 13 is applied prior to the control of the friction braking caused by the hydraulic brake pressure generation device 26." means, for example, that, in performing cooperation between the regenerative brake control and the friction brake control, the control of the regenerative braking caused by the electric motor 13 is applied with priority, and a shortage of brake force obtained by using the control of the regenerative braking caused by the electric motor 13 is compensated by a brake force obtained by the use of the control of the friction braking caused by the hydraulic brake pressure generation device 26.

[Function Block Configuration of Vehicle Brake Force Generation Device 11 According to Embodiment of the Invention]

Figure 2B:
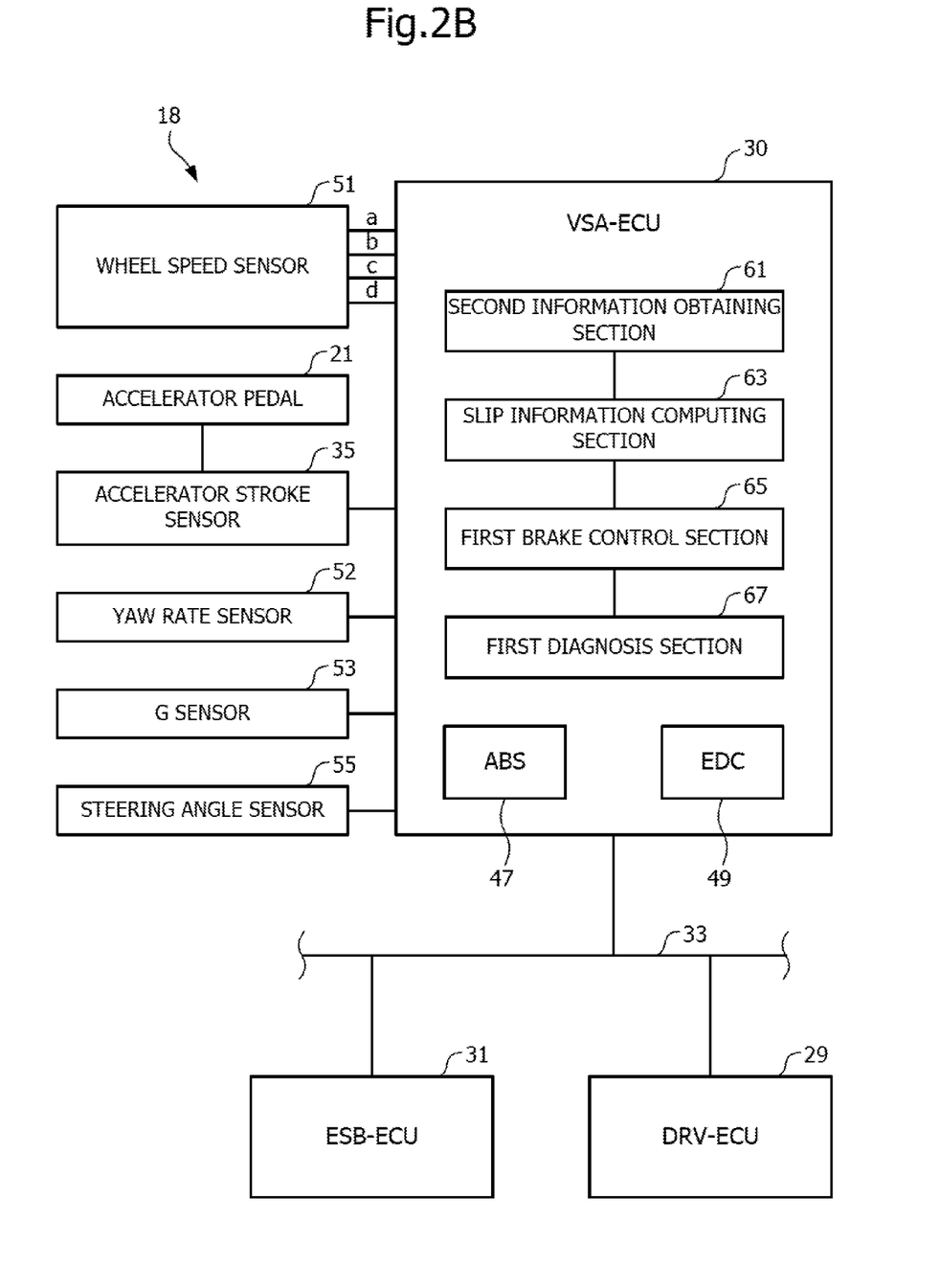
FIG. 2B is a function block configuration diagram representing the overview of the periphery of a VSA-ECU.

The outline of the vehicle brake force generation device 11 according to embodiment of the present invention will be described, referring to FIG. 2A. FIG. 2A is a function block configuration diagram representing the overview of the periphery of the vehicle brake force generation device 11 according to an embodiment of the present invention. FIG. 2B is a function block configuration diagram representing the overview of the periphery of the VSA-ECU 30.

[Configuration of DRV-ECU 29]

The DRV-ECU 29 has a function to perform drive control of the electric motor 13. As shown in FIG. 2A, to the DRV-ECU 29 connected are a vehicle speed sensor 39 for detecting the running speed (hereinafter, referred to as "vehicle speed") of the electric vehicle V, and a range switch 41 for detecting the operation position of a selection lever (not shown) used in switching the shift position.

As shown in FIG. 2A, the DRV-ECU 29 is configured including a first information obtaining section 43 and a drive control section 45.

As shown in FIG. 2A and FIG. 2B, the first information obtaining section 43 has a function to obtain information, which is the information of the operation amount of acceleration/deceleration of an accelerator pedal 21 detected by a later-described accelerator stroke sensor 35, from the VSA-ECU 30 via the CAN communication medium 33. The information of the operation amount of acceleration/deceleration of an accelerator pedal 21 obtained by the first information obtaining section 43 is referred to, as appropriate, by the drive control section 45 in setting the power running torque of the electric motor 13 or the like.

Further, as shown in FIG. 2A and FIG. 2B, the first information obtaining section 43 has a function to obtain information, which is the information of the brake operation amount of the brake pedal 23 detected by a later-described brake stroke sensor 37, from the ESB-ECU 31 via the CAN communication medium 33. The information, which is obtained by the first information obtaining section 43 and is on the brake operation amount of the brake pedal 23, is referred to, as appropriate, by the drive control section 45 in setting the regenerative torque of the electric motor 13 or the like.

The drive control section 45 has a function to set a power running torque of the electric motor 13, based on information of the vehicle speed detected by the vehicle speed sensor 39, information of the acceleration/deceleration operation amount of the accelerator pedal 21 obtained by the first information obtaining section 43, information of the range position of the range switch 41, and the like, and referring to a predetermined power running torque map.

Further, the drive control section 45 has a function to set a regenerative torque of the electric motor 13, based on information of the vehicle speed detected by the vehicle speed sensor 39, information of the brake operation amount of the brake pedal 23 obtained by the first information obtaining section 43, information of the range position of the range switch 41, and the like, and referring to a predetermined regenerative torque map.

Further, the drive control section 45 has a function to set a target torque for which the power running torque and the regenerative torque having been set above are integrated, and a function to output a drive control signal to the inverter 19, the drive control signal being for the electric motor 13 and based on the target torque having been set above.

The DRV-ECU 29 is configured by a microcomputer having a CPU (Central Processing Unit), a ROM (Read Only Memory), a RAM (Random Access Memory), and the like. This microcomputer reads out programs and data stored in the ROM and executes the programs, and operates so as to perform control of executing various functions including a function to obtain various information and a function to control driving of the electric motor 13, which the DRV-ECU 29 has.

[Configuration of VSA-ECU 30]

The VSA-ECU 30 has a function to perform control for stabilizing the behavior of the electric vehicle V. As shown in FIG. 2A and FIG. 2B, the VSA-ECU 30 is provided with an ABS (Antilock Brake System) 47, and an EDC (Engine Drag Torque Control) system 49. The ABS 47 has a function to avoid locking of the wheels 17a-17d through control of the hydraulic brake pressure (friction brake control) of the hydraulic brake pressure generation device 26. On the other hand, the EDC system 49 has a function to avoid locking of the wheels 17a-17d through the control of regenerative braking caused by the electric motor 13.

As shown in FIG. 2B, to the VSA-ECU 30 connected are the accelerator stroke sensor 35 for detecting the acceleration/deceleration operation amount of the accelerator pedal 21, a yaw rate sensor 52 for detecting a yaw rate occurring on the electric vehicle V, a G sensor 53 for detecting longitudinal G (longitudinal acceleration)/lateral G (lateral acceleration) occurring on the electric vehicle V, and a steering angle sensor 55 for detecting the steering amount and the steering direction of steering.

Herein, the VSA device 18 refers to a concept including all of the VSA-ECU 30 and input system sensors and output system devices connected to the VSA-ECU 30.

As shown in FIG. 2B, the VSA-ECU 30 is configured including, in addition to the ABS 47 and the EDC system 49, a second information obtaining section 61, a slip information computing section 63, a first brake control section 65, and a first diagnosis section 67.

The second information obtaining section 61 has functions to respectively obtain information of the respective rotation speeds (wheel speeds) of the plural wheels 17a-17d detected by wheel speed sensors 51a-51d, information of the acceleration/deceleration operation amount of the accelerator pedal 21 detected by the accelerator stroke sensor 35, information of the yaw rate occurring on the electric vehicle V detected by the yaw rate sensor 52, information of the longitudinal G (longitudinal acceleration)/lateral G (lateral acceleration) occurring on the electric vehicle V detected by the G sensor 53, and information of the steering amount and the steering direction of steering detected by the steering angle sensor 55.

Further, as shown in FIG. 2A and FIG. 2B, the second information obtaining section 61 has a function to obtain information, of the vehicle speed detected by the vehicle speed sensor 39, from the DRV-ECU 29 via the CAN communication medium 33.

The slip information computing section 63 has a function to obtain, by computation during driving of the electric vehicle V, slip ratios (corresponding to the "slip information" in the present invention) SR of the plural respective wheels 17a-17d, based on the information of the vehicle speed obtained by the second information obtaining section 61 and the information of the rotation speeds (wheel speeds) of the plural respective wheels 17a-17d. The information of the slip ratios SR of the plural respective wheels 17a-17d obtained by the slip information computing section 63 is referred to, as appropriate, for example, in determining necessity/unnecessity of operation of the ABS 47 and the EDC system 49 by the first brake control section 65

The first brake control section 65 basically has a function to determine necessity/unnecessity of the operation of the ABS 47 and the EDC system 49, based on information of the slip ratios of the plural respective wheels 17a-17d obtained by the slip information computing section 63, or the like, and a function to transmit to the ESB-ECU 31 an instruction information of cooperative brake control regarding at least one of the control of the regenerative braking caused by the electric motor 13 and the control of the friction braking caused by the hydraulic brake pressure generation device 26 so as to restrict slip of the plural wheels 18a-17d if it is determined that operation of the ABS 47 and the EDC system 49 is necessary as a result of the above-described determination.

In detail, the first brake control section 65 has a function to estimate the behavior of the electric vehicle V, based on detection signals from various sensors including the wheel speed sensors 51a-51d, the G sensor 53, the steering angle sensor 55, and the hydraulic pressure sensor 57; a function to compute and obtain, based on a result of the above-described estimation, brake forces (brake torques) of the plural respective wheels 17a-17d necessary for stabilizing the behavior of the electric vehicle V; a function to perform an instruction for the control of the friction braking caused by the hydraulic brake pressure generation device 26 and adjust the friction brake torques for the plural respective wheels 17a-17d so as to obtain brake forces according to the result of the computation of the brake forces for the plural respective wheels 17a-17d; and a function to perform an instruction for the control of the regenerative braking caused by the electric motor 13 and adjust the regenerative brake torques for the plural respective wheels 17a-17d so as to obtain brake forces according to the result of the computation of the brake forces for the plural respective wheels 17a-17d.

Concretely, if one or more of the slip ratios SR of the plural respective wheels 17a-17d exceed a predetermined first slip ratio threshold SRth1, in other words, if one or more of the plural wheels 17a-17d tend to slip, the first brake control section 65 adjusts the brake forces of target wheels in the slip tendency via the ESB-ECU 31 and operates to thereby stabilize the behavior of the electric vehicle V.

There are two methods for the first brake control section 65 to adjust the brake force of the target wheels in the slip tendency. In the first brake force adjustment method, the first brake control section 65 makes certain friction braking performed, using a hydraulic brake pressure generated by the hydraulic brake pressure generation device 26, and thereby adjusts the friction brake torques for the plural respective wheels 17a-17d. In the second brake force adjustment method, the first brake control section 65 makes certain regenerative braking performed, using the electric motor 13, and thereby adjusts the regenerative brake torques for the plural respective wheels 17a-17d. Incidentally, by using a combination of the first and second brake force adjustment methods, the first brake control section 65 may adjusts both the friction brake torques and the regenerative brake torques.

Further, the first brake control section 65 has a function to compute and obtain a target behavior of the electric vehicle V intended by the driver, based on information of the steering amount and the steering direction of steering, information of the acceleration/deceleration operation amount of the accelerator pedal 21, the respective information being obtained by the second information obtaining section 61, and information of the brake operation amount of the brake pedal 23. Further, the first brake control section 65 has a function to compute and obtain the real behavior of the electric vehicle V, based on information of the longitudinal G (longitudinal acceleration)/ lateral G (lateral acceleration) occurring on the electric vehicle V and information of the rotation speeds (wheel speeds) of the plural respective wheels 17a-17d.

The first brake control section 65 determines the degree of understeering or oversteering, based on the target behavior intended by the driver and the real behavior of the electric vehicle V. As a result of this determination, if it is determined that one or more of the plural respective wheels 17a-17d are in a tendency to slip, the first brake control section 65 adjusts the brake forces of target wheels in the slip tendency via the ESB-ECU 31 and operates to thereby stabilize the behavior of the electric vehicle V similarly to the above.

Further, when the VSA device 18 is normally operating and cooperative brake control including at least the control of the regenerative braking caused by the electric motor 13 is currently performed, the first brake control section 65 gradually decreases the control amount of regenerative braking down to zero, and after the control amount of the regenerative braking has become zero, the first brake control section 65 operates so as to transmit a brake control instruction to the ESB-ECU 31 to maintain the control state of the time the control amount of the regenerative braking has become zero.

Herein, a state "The VSA device 18 is normally operating." means a state that an inoperative is occurring on the ABS 47 and the EDC system 49. Concretely, for example, a case that either the ABS 47 or the EDC system 49 is currently operating or that the later-described early stoppage of regeneration is currently requested corresponds to a case that the VSA device 18 is normally operating. Further, "Gradually decreasing the control amount of regenerative braking down to zero" includes embodiment of gradually decreasing the regenerative brake force temporally and linearly, embodiment of gradually decreasing the regenerative brake force in a step state, and embodiment of combination of these.

Herein, early stoppage of regeneration means terminating the regenerative braking caused by the electric motor 13 at a timing earlier than a normal case if one or more of the slip ratios SR of plural wheels 17a-17d exceed, for example, the second slip ratio threshold SRth2 lower than the first slip ratio threshold SRth1 of the operation trigger of the ABS 47.

Concretely, for example, in a scene where the electric vehicle V is running on a low-p road such as a wet road or a snow-covered road (Deviation between the front wheels and the rear wheels in the wheel speed or deviation between the inner wheels and the outer wheels in the wheel speed is exceeding a predetermined threshold), the first brake control section 65 requests early stoppage of regeneration. This is aimed at the following. In a scene of running on a low-μ road, if cooperative brake control using regenerative braking and friction braking in an appropriate allocation rate is performed, a temporal delay in the brake control operation may occur by the time length required by computation of the allocation rate of the cooperative brake control. Herein, in a scene of running on a low-p road, by performing only friction braking by stopping the cooperative brake control by requesting early stoppage of regeneration, response to the brake control operation is made quicker, and the vehicle stabilizing assistance performance of the electric vehicle V exerted by the VSA device 18 is increased.

Further, the first brake control section 65 has a function to rewrite an ABS operation flag representing whether or not the ABS 47 is in operation and an EDC operation flag representing whether or not the EDC system 49 is in operation, according to a result of determination of the necessity/unnecessity of operation of the ABS 47 or the EDC system 49. Further, the first brake control section 65 has a function to rewrite a regeneration early stopping flag representing whether or not to terminate the regeneration braking of the electric motor 13 at a timing earlier than a normal case, according to a result of comparison between the slip ratios SR of the plural respective wheels 17a-17d and the above-described second slip ratio threshold SRth2.

Either the first brake control section 65 or the second brake control section (described later) 73 or both of them correspond to a "brake control section" in the present invention.

Incidentally, in case that the first brake control section 65 has determined that one or more of the plural wheels 17a-17d are in a slip tendency, if ABS control has been performed so as to adjust (decrease the hydraulic brake pressure) the brake force for one or more of the target wheels in the slip tendency, it is necessary to return the target wheels in the slip tendency quickly to a rotation state for a purpose of stabilizing the behavior of the electric vehicle V.

In this situation, the first brake control section 65 of the VSA-ECU 30 and the drive control section 45 of the DRV-ECU 29 perform the following cooperative brake control. That is, the first brake control section 65 of the VSA-ECU 30 transmits information of the operation state of the ABS 47 (information on what kind of ABS control has been performed on which target wheel) to the drive control section 45 of the DRV-ECU 29 via the CAN communication medium 33.

Upon reception of this, the drive control section 45 of the DRV-ECU 29 outputs a drive control signal for the electric motor 13 to the inverter 19, based on information of the operation state of the ABS 47, the vehicle speed, and the like. Then, the electric motor 13 in relation to the target wheels in the slip tendency is controlled to be in a power running state that outputs a certain output torque. As a result, the target wheels having been in the slip tendency can be quickly returned to the rotation state so that the behavior of the electric vehicle V can be quickly stabilized.

As shown in FIG. 2B, the first diagnosis section 67 has a function to diagnose whether or not the VSA device 18 is in an abnormal state. Herein, the VSA device 18 refers to a concept including the VSA-ECU 30 and various sensors 35, 51, 52, 53, and 55 connected to the VSA-ECU 30. Concretely, for example, in case that the ABS 47 or the EDC system 49 is in an inoperative state, the first diagnosis section 67 determines by diagnosis that the VSA device 18 as it is in an abnormal state.

Further, for example, in case that the detection output levels of the wheel speed sensors 51a-51d are out of a predetermined normal range, the first diagnosis section 67 determines by diagnosis that the VSA device 18 as it is in an abnormal state.

Herein, a case that the detection output levels of the wheel speed sensors 51a-51d are out of the normal range corresponds to a case that the probability of occurrence of some abnormality on the wheel speed sensors 51a-51d is high. The detection output of the wheel speed sensors 51a-51d is essential information in realizing the VSA control function (including the ABS control function and the EDC control function). Accordingly, in case that the detection output levels of the wheel speed sensors 51a-51d are out of the normal range, the first diagnosis section 67 determines by diagnosis that the VSA device 18 as it is in an abnormal state.

Further, the first diagnosis section 67 has a function to diagnose whether or not information communication of cooperative brake control is abnormal, the information communication being performed between the first brake control section 65 of the VSA-ECU 30 and the drive control section 45 of the DRV-ECU 29 via the CAN communication medium 33 to reduce slip of the wheels 18a-17d.

Concretely, for example, as preparation for diagnosis on whether or not the information communication of the cooperative brake control is abnormal, for example, information representing being an object of abnormality diagnosis is attached in advance to a communication message including information (including both information of the ABS 47 and information of the EDC system 49) regarding the VSA device 18 with the VSA device 18 being the address or the sender. Each time a communication message flowing through the CAN communication medium 33 is created, the first diagnosis section 67 checks whether or not information representing being an object of abnormality diagnosis is attached to the communication message. Then, in case that the first diagnosis section 67 has received a communication message related to an object of abnormality diagnosis and this communication message is abnormal, the first diagnosis section 67 determines by diagnosis that the information communication related to the above-described cooperative brake control is abnormal.

The reason for making diagnosis whether or not information communication related to the above-described cooperative brake control is abnormal is that information of the above-described cooperative brake control is essential information for the drive control section 45 to appropriately perform incorporative brake control (for example, drive control of the electric motor 13 performed, based on information of the operation state of the ABS) between the first brake control section 65 and the drive control section 45.

If some abnormality has occurred on the CAN communication medium 33 used for information communication between the VSA-ECU 30 and the DRV-ECU 29, then consequently, information communication related to the above-described cooperative brake control performed between the first brake control section 65 of the VSA-ECU 30 and the drive control section 45 of the DRV-ECU 29 also falls into an abnormal state. Accordingly, the diagnosis information regarding as to whether or not the information communication related to the above-described cooperative brake control is abnormal includes diagnosis information regarding as to whether or not the CAN communication medium 33 used for information communication between the VSA-ECU 30 and the DRV-ECU 29 is abnormal.

Objects of diagnosis by the first diagnosis section 67 are not limited to information communication messages related to detection outputs of the wheel speed sensors 51a-51d and the above-described cooperative brake control. Detection outputs of other sensors referred to by the ABS 47 and the EDC system 49 may be used, as appropriate, as objects of diagnosis by the first diagnosis section 67.

Either the first diagnosis section 67 or the second diagnosis section (described later) 75, or both of them correspond to a "diagnosis section" in the present invention.

Then, the VSA-ECU 30 transmits diagnosis information as to whether or not the VSA device 18 is abnormal at a predetermined certain cycle at a timing of rewriting the information of an ABS operation flag, the EDC operation flag, or the regeneration early stopping flag, to the ESB-ECU 31 via the CAN communication medium 33 together with the information of the ABS operation flag, the EDC operation flag, and the regeneration early stopping flag.

However, in a case that the CAN communication medium 33 is in an abnormal state, the VSA-ECU 30 cannot transmit the diagnosis information as to whether or not the VSA device 18 is in an abnormal state to the ESB-ECU 31. In such a case, as described later, the second diagnosis section 75 of the ESB-ECU 31 can perform integral diagnosis as to whether or not the VSA device 18 is abnormal.

The above-described VSA-ECU 30 is configured by a microcomputer provided with a CPU (Central Processing Unit), a ROM (Read Only Memory), a RAM (Random Access Memory) and the like. This microcomputer reads out programs and data stored in the ROM and executes the programs, and operates so as to perform control of execution of various functions which the VSA-ECU 30 has including a function to obtain various information, a function to compute slip information, an abnormality diagnosis function on information communication related to the VSA device 18, and a function to control braking for stabilization of the behavior of the electric vehicle V.

(Configuration of ESB-ECU 31)

To the ESB-ECU 31, connected are, as shown in FIG. 2A, the brake stroke sensor 37 for detecting the brake operation amount of the brake pedal 23 and hydraulic brake pressure sensors 57 for detecting the hydraulic brake pressures of the respective parts of the hydraulic brake pressure system of the hydraulic brake pressure generation device 26.

As shown in FIG. 2A, the ESB-ECU 31 is configured, including a third information obtaining section 71, a second brake control section 73, and a second diagnosis section 75.

As shown in FIG. 2A, the third information obtaining section 71 has a function to obtain information of the brake operation amount of the brake pedal 23 detected by the brake stroke sensor 37 and information including information related to the hydraulic brake pressure of the respective parts detected by the hydraulic brake pressure sensors 57.

Further, the third information obtaining section 71 has a function to obtain diagnosis information on whether or not the VSA device 18 is abnormal, information of the cooperative brake control, information of the ABS operation flag, the EDC operation flag, the regeneration early stopping flag, and brake control instruction information regarding at least one of the control of regenerative braking caused by the electric motor 13 and the control of friction braking caused by the hydraulic brake pressure generation device 26, from the VSA-ECU 30 via the CAN communication medium 33.

The second brake control section 73 has a function to control the friction brake torque caused by the hydraulic brake pressure generation device 26 so as to follow a target brake torque corresponding to the brake operation amount of the brake pedal 23, based on basically information of the brake operation amount of the brake pedal 23 obtained by the third information obtaining section 71 and information of the hydraulic brake pressures of the above-described respective parts.

Further, the second brake control section 73 has a function to integrally perform the control of the regenerative braking caused by the electric motor 13 and the control of the friction braking caused by the hydraulic brake pressure generation device 26, based on the diagnosis information obtained by the third information obtaining section 71 and regarding whether or not the VSA device 18 is abnormal, information of the cooperative brake control, information of the ABS operation flag, the EDC operation flag, the regeneration early stopping flag, and brake control instruction information regarding at least one of the control of the regenerative braking caused by the electric motor 13 and the control of the friction braking caused by the hydraulic brake pressure generation device 26, and further taking into account the friction brake torque of the hydraulic brake pressure generation device 26.

The second diagnosis section 75 basically has a function to perform abnormality diagnosis of the CAN communication medium 33 used for information communication between the VSA-ECU 30 and the ESB-ECU 31. Further, the second diagnosis section 75 has a function to integrally diagnose the abnormality of the VSA device 18, based on diagnosis information, obtained by the third information obtaining section 71, on whether or not the VSA device 18 is in an abnormal state, and information diagnosis information of the CAN communication medium 33 used for the information communication between the VSA-ECU 30 and the ESB-ECU 31.

The ESB-ECU 31 is configured by a microcomputer provided with a CPU (Central Processing Unit), a ROM (Read Only Memory), a RAM (Random Access Memory), and the like. This microcomputer reads out programs and data stored in the ROM and executes the programs to operate so as to perform control of execution of various functions of the ESB-ECU 31 including a function to obtain various information, a function to diagnose the abnormality of the CAN communication medium 33, and a function to control the hydraulic brake pressure (brake torque) applied to the above-described calipers 27a-27d.

(Operation of Vehicle Brake Force Generation Device 11 According to Embodiment of the Invention)

Figure 3:
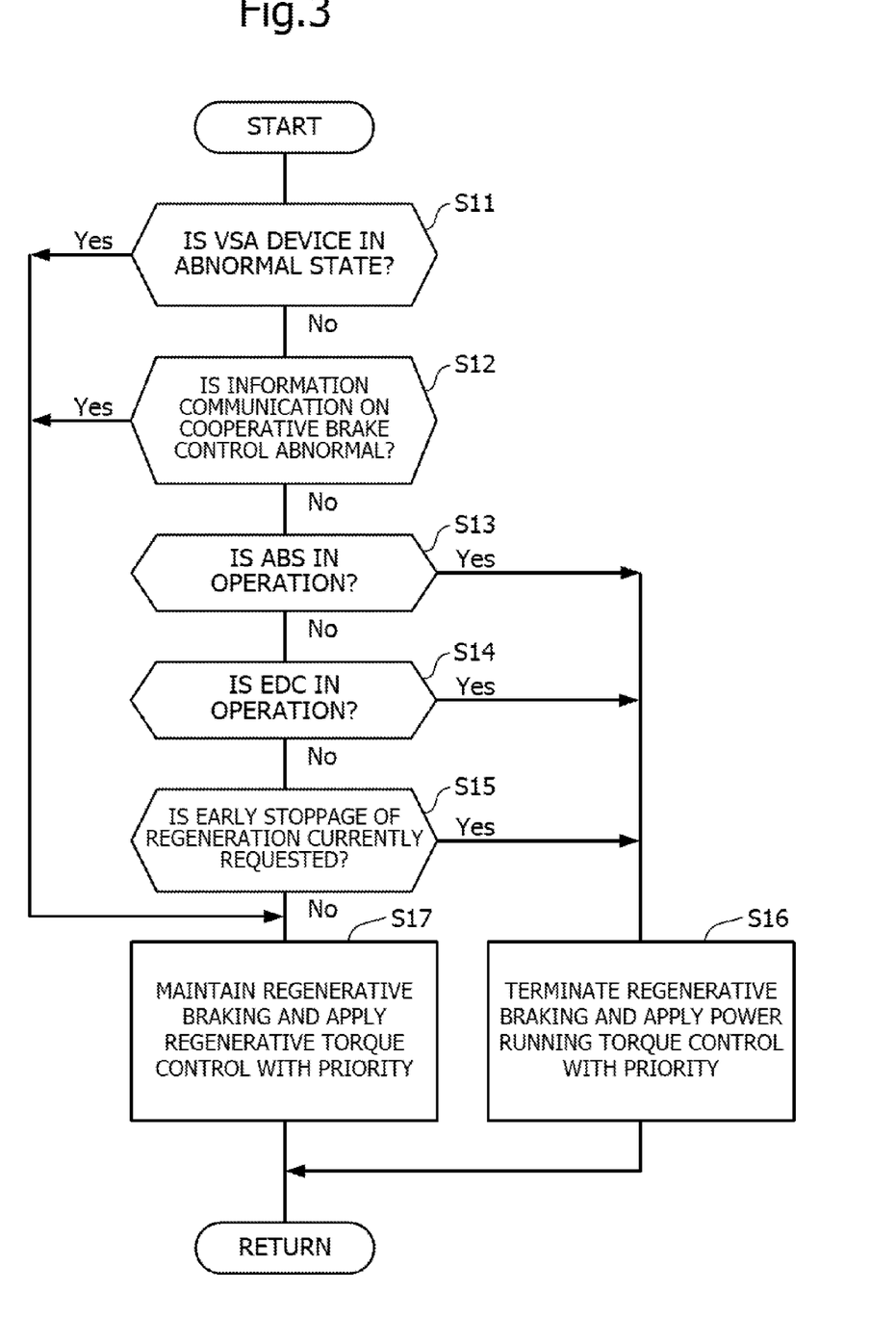
FIG. 3 is a flowchart diagram showing the flow of a cooperative brake control process performed by the vehicle brake force generation device according to an embodiment of the invention.

In the following, the operation of the vehicle brake force generation device 11 according to embodiment of the invention will be described, referring to FIG. 3. FIG. 3 is a flow-chart diagram showing the flow of a cooperative brake control performed by the vehicle brake force generation device 11 according to an embodiment of the invention. Herein, it is assumed that the second brake control section 73 of the ESB-ECU 31 is actually performing the cooperative brake control including both the control of the regenerative braking caused by the electric motor 13 and the control of the friction braking caused by the hydraulic brake pressure generation device 26.

In step S11 shown in FIG. 3, the second diagnosis section 75 of the ESB-ECU 31 diagnoses whether or not the VSA device 18 is in an abnormal state, based on information transmitted from the VSA-ECU 30 on diagnosis as to whether or not the VSA device 18 is in an abnormal state. As a result of the diagnosis in step S11, if it is determined by the diagnosis that the VSA device 18 is in an abnormal state ("Yes" in step S11), the ESB-ECU 31 makes the flow of the process jump to step S17. On the other hand, if it is determined by the diagnosis that the VSA device 18 is not in an abnormal state ("No" in step S11), the ESB-ECU 31 makes the flow of the process proceed to the subsequent step S12.

In step S12, the second diagnosis section 75 of the ESB-ECU 31 diagnoses whether or not the information communication (particularly, the information communication regarding the VSA device 18) transmitted from the VSA-ECU 30 is abnormal, the information communication being on the cooperative brake control performed between the first brake control section 65 of the VSA-ECU 30 and the drive control section 45 of the DRV-ECU 29.

As a result of the diagnosis in step S12, if it is determined by diagnosis that the information communication on the cooperative brake control is abnormal ("Yes" in step S12), the ESB-ECU 31 makes the flow of the process jump to step S17. On the other hand, as a result of the diagnosis in step S12, if it is determined that the information communication using the CAN communication medium 33 is not abnormal ("No" in step S12), the ESB-ECU 31 makes the flow of the process proceed to step S13.

In step S13, the ESB-ECU 31 refers to an ABS operation flag transmitted from the VSA-ECU 30, and determines whether or not the ABS 47 is in operation. As a result of step S13, if it is determined that the ABS 47 is in operation ("Yes" in step S13), the ESB-ECU 31 makes the flow of the process jump to step S16. On the other hand, as a result of the determination in step S13, if it is determined that the ABS is not in operation ("No" in step S13), the ESB-ECU 31 makes the flow of the process proceed to the next step S14.

In step S14, the ESB-ECU 31 refers to an EDC operation flag transmitted from the VSA-ECU 30, and determines whether or not the EDC system 49 is in operation. As a result of the determination in step S14, if it is determined that the EDC system 49 is in operation ("Yes" in step S14), the ESB-ECU 31 makes the flow of the process jump to step S16. On the other hand, as a result of the determination in step S14, if it is determined that the EDC system 49 is not in operation ("No" in step S14), the ESB-ECU 31 makes the flow of the process proceed to step S15. It is determined whether or not the EDC system 49 is in operation.

In step S15, the ESB-ECU 31 refers to an EDC operation flag transmitted from the VSA-ECU 30, and determines whether or not early stoppage of regeneration is currently requested. As a result of step S15, if it is determined that early stoppage of regeneration is currently requested ("Yes" in step S15), the ESB-ECU 31 makes the flow of the process jump to step S16. On the other hand, as a result of step S15, if it is determined that early stoppage of regeneration is not currently requested ("No" in step S15), the ESB-ECU 31 makes the flow of the process proceed to the next step S17.

In step S16, the second brake control section 73 of the ESB-ECU 31 gradually decreases the control amount of the regenerative braking caused by the electric motor 13 down to zero, and after the control amount of the regenerative braking caused by the electric motor 13 has become zero, the second brake control section 73 performs brake control to maintain the control state of the time when the control amount of the regenerative braking has become zero. That is, the second brake control section 73 terminates the regenerative braking and performs brake control (which is cooperative brake control different from principle) to which power running torque control is applied with priority.

In detail, if information communication on the cooperative brake control performed between the first brake control section 65 of the VSA-ECU 30 and the drive control section 45 of the DRV-ECU 29 is normal, if the VSA device 18 is in normal operation, and if one or more conditions of "the ABS 47 being in operation", "the EDC system 49 being in operation", and "early stoppage of regeneration being currently requested" are satisfied, then the second brake control section 73 of the ESB-ECU 31 sets a power running torque of the electric motor 13, based on information on the operation state of the VSA device 18. Herein, the information on the operation state of the VSA device 18 means information on the kind of brake control (for example, ABS control) being performed on target wheels and on the magnitude of the brake torque applied in the control.

Then, the second brake control section 73 sets a target torque with integration of the regenerative torque (zero in principle with exception in a decreasing process of the control amount of the regenerative braking) and the power running torque, and performs brake control in which the power running torque of the electric motor 13 is applied with priority, based on the target torque having been set.

After the above-described series of processes, the ESB-ECU 31 returns the flow of process to step S11, and makes the following process repeatedly performed.

As described above, if information communication on the cooperative brake control is normal, if the VSA device 18 is in normal operation, and if one or more conditions of "the ABS 47 being in operation", "the EDC system 49 being in operation", and "early stoppage of regeneration being currently requested" are satisfied, then a power running torque is output from the electric motor 13, based on the information of the operation state of the VSA device 18 and the like. Accordingly, if any one of the ABS 47, the EDC system 49, and the early stoppage of regeneration is operated to thereby decrease the hydraulic brake pressure, the target wheels can be appropriately returned to a rotation state. As a result, the behavior of the electric vehicle V can be quickly stabilized.

On the other hand, in step S17, the second brake control section 73 of the ESB-ECU 31 maintains the regenerative braking caused by the electric motor 13, and performs brake control (principle cooperative brake control) in which regenerative torque control is applied with priority. That is, the second brake control section 73 performs cooperative brake control in which the regenerative torque control is applied with priority by maintaining the regenerative braking caused by the electric motor 13 based on the target torque having been used until a time immediately before the VSA device 18 has become into an abnormal state or immediately before information communication on the cooperative brake control has become into an abnormal state.

Incidentally, if information communication on the cooperative brake control is normal, if the VSA device 18 is in normal operation, and if one or more conditions of "the ABS 47 being in operation", "the EDC system 49 being in operation", and "early stoppage of regeneration being currently requested" are satisfied, then the second brake control section 73 sets a power running torque of the electric motor 13, based on information (for example, the deceleration detected by the G sensor 53) on the operation state of the electric vehicle V.

Then, the second brake control section 73 sets a target torque with integration of the regenerative torque and the power running torque (zero in this case as a regenerative torque is set), and performs regenerative torque control of the electric motor 13, based on the target torque having been set.

After the above-described series of processes, the ESB-ECU 31 returns the flow of the process to step S11, and makes the following process repeatedly performed.

Herein, the scene where the process in step S17 is performed is exactly a scene where control of regenerative torque (regenerative braking) caused by the electric motor 13 is performed. This is because, in order to gain an electricity amount obtained by regenerative braking, the control of the regenerative braking caused by the electric motor 13 is applied with priority over the control of the friction braking caused by the hydraulic brake pressure generation device 26 in the vehicle brake force generation device 11 according to an embodiment of the present invention.

Accordingly, in a scene where the process in step S17 is performed, the control of the regenerative braking caused by the electric motor 13 is maintained as it is so that the cooperative brake control (the principle cooperative brake control), in which regenerative torque control is applied with priority, continues to be performed. As a result, when at least one of the information communication on the cooperative brake control and the VSA device 18 is in an abnormal state, a satisfactory braking feeling can be given to the driver, compared with a case of performing control that prohibits regenerative braking caused by the electric motor 13. Further, as the kinetic energy of the electric vehicle V can be recovered by conversion into electric energy, an electricity amount obtained by regenerative braking can be gained.

(Operation and Advantage of Vehicle Brake Force Generation Device 11 According to Embodiment of the Invention)

In the following, the operation and advantage of the vehicle brake force generation device 11 according to embodiment of the invention will be described.

The vehicle brake force generation device 11 in the first aspect (corresponding to claim 1) includes: the electric motor 13 applying a drive force and a regenerative brake force to the wheels 17a-17d of the electric vehicle (vehicle) V; the hydraulic brake pressure generation device 26 for generating hydraulic brake pressures to be applied to the calipers (brake members) 27a-27d of the electric vehicle (vehicle) V; a slip information computation section 63 for obtaining slip information (slip ratios) of the wheels 17a-17d; a VSA device (behavior-stabilization assistance device) 18 for performing the control of the friction braking caused by at least the hydraulic brake pressure generation device 26 so as to reduce slip of the wheels 17a-17d, based on the slip information; a diagnosis section for performing diagnosis of the VSA device 18; and a brake control section for performing cooperative brake control including at least one of the control of the regenerative braking caused by the electric motor 13 and the control of the friction braking caused by the hydraulic brake pressure generation device 26.

Herein, the "diagnosis section" means at least one of the first diagnosis section 67 and the second diagnosis section 75 (likewise hereinafter). Further, the "brake control section" means at least one of the first brake control section 65 and the second brake control section 73 (likewise hereinafter).

In the vehicle brake force generation device 11 based on the first aspect, if the brake control section has obtained diagnosis information during the cooperative brake control including at least the control of the regenerative braking caused by the electric motor 13, the diagnosis information representing that the VSA device 18 is in an abnormal state, then the brake control section maintains the state of the control of the regenerative braking caused by the electric motor 13.

By the vehicle brake force generation device 11 based on the first aspect, when, for example, the ABS 47 of the VSA device 18 is in an abnormal state, a satisfactory braking feeling can be given to the driver, compared with a case of performing control that prohibits regenerative braking caused by the electric motor 13. Further, as the kinetic energy of the electric vehicle V can be recovered by conversion into electric energy, an electricity amount obtained by regenerative braking can be gained.

Further, for example, in a case that diagnosis information representing that the VSA device 18 is in an abnormal state has been obtained, it will be assumed in the following, for example, that the second brake control section 73 has received a control signal representing that regenerative braking by the electric motor 13 is prohibited.

However, based on a control signal, which has been received when the VSA device 18 is in an abnormal state, probably includes an error. Based on a control signal, with a high probability of including an error, representing that the regenerative braking by the electric motor 13 is prohibited, if the second brake control section 73 performs control to prohibit regenerative braking caused by the electric motor 13, it is possible that fuel economy (electrical economy), which would have been normally obtained, becomes lost.

In this point, by the vehicle brake force generation device 11 based on the first aspect, as a state of the control of the regenerative braking caused by the electric motor 13 is maintained if the VSA device 18 is in an abnormal state, it is possible to expect an advantage of avoiding in advance a situation that a fuel economy (electric economy), which would have been normally obtained, becomes lost.

Further, in a case that the vehicle brake force generation device 11 based on the first aspect is applied to, for example, a front-wheel drive vehicle or a four-wheel-drive vehicle, when the VSA device 18 has become into an abnormal state, the state of the control of the regenerative braking caused by the electric motor 13 is maintained. Thus, the drive wheels firmly contact with the road surface, and it thereby possible to expect an advantage of avoiding in advance a situation that the behavior of the electric vehicle (vehicle) V becomes unstable.

The vehicle brake force generation device 11 in the second aspect (corresponding to claim 2) further includes the drive control section 45 for performing drive control of the electric motor 13, based on the acceleration/deceleration operation information of the electric vehicle (vehicle) V, and the CAN communication medium (information communication medium) 33 used in performing information communication between the brake control section and the drive control section 45.

In the vehicle brake force generation device 11 based on the second aspect, arrangement may be made such that the diagnosis section further has a function to perform abnormality diagnosis of the information communication performed via the CAN communication medium (information communication medium) 33, wherein the brake control section maintains the state of the control of the regenerative braking caused by the electric motor 13 when the brake control section has obtained diagnosis information during the cooperative brake control including at least the control of the regenerative braking caused by the electric motor 13, the diagnosis information representing that information communication on the cooperative brake control, which is performed between the brake control section and the drive control section 45 to reduce the slip of the wheels 17a-17d, is abnormal.

By the vehicle brake force generation device 11 based on the second aspect, for example, in a case that some abnormality of information communication on the cooperative brake control (including the abnormality of the CAN communication medium 33) has occurred, the state of the control of the regenerative braking caused by the electric motor 13 is maintained. Accordingly, in addition to the above-described operation and advantage achieved by the vehicle brake force generation device 11 based on the first aspect, it is possible to individually and concretely manage a case of maintaining the state of the control of the regenerative braking caused by the electric motor 13.

Further, in the vehicle brake force generation device 11 based on the third aspect (corresponding to claim 3), arrangement may be made such that the diagnosis section further has a function to perform abnormality diagnosis of the above-described information communication performed via the CAN communication medium (information communication medium) 33, wherein the brake control section maintains the state of the control of the regenerative braking caused by the electric motor 13 when the brake control section has obtained diagnosis information during the cooperative brake control including at least the control of the regenerative braking caused by the electric motor 13, the diagnosis information representing that information communication on the cooperative brake control, which is performed between the brake control section and the drive control section 45 to reduce the slip of the wheels 17a-17d, is abnormal and representing that the VSA device (behavior-stabilization assistance device) 18 is in an abnormal state.

By the vehicle brake force generation device 11 based on the third aspect, the state of the control of the regenerative braking caused by the electric motor 13 is maintained, for example, in a case that some abnormality of the CAN communication medium 33 has occurred and the VSA device 18 is in an abnormal state. Accordingly, in addition to the above-described operation and advantage achieved by the vehicle brake force generation device 11 based on the first aspect, it is possible to individually and concretely manage a case of maintaining the state of the control of the regenerative braking caused by the electric motor 13.

Still further, in the vehicle brake force generation device 11 based on the fourth aspect (corresponding to claim 4), arrangement may be made such that the diagnosis section further has a function to perform abnormality diagnosis of the information communication performed via the CAN communication medium (information communication medium) 33, wherein the brake control section gradually decreases the control amount of regeneration braking caused by the electric motor 13 when the brake control section has obtained diagnosis information during the cooperative brake control including at least the control of the regenerative braking caused by the electric motor 13, the diagnosis information representing that information communication on the cooperative brake control, which is performed between the brake control section and the drive control section 45 to reduce the slip of the wheels 17a-17d, is normal and representing that the VSA device (behavior-stabilization assistance device) 18 is in normal operation.

By the vehicle brake force generation device 11 based on the fourth aspect, for example, in a case that information communication via the CAN communication medium 33 is normal and the VSA device 18 is in normal operation (for example, one or more conditions of "the ABS 47 being in operation", "the EDC system 49 being in operation", and "early stoppage of regeneration being currently requested" are satisfied), the control amount of the control of the regenerative braking caused by the electric motor 13 is gradually decreased so that, in addition to the above-described operation and advantage of the vehicle brake force generation device 11 based on the first aspect, it is possible to improve the behavior-stabilization performance obtained by the VSA device 18.

The vehicle brake force generation device 11 based on the fifth aspect (corresponding to claim 5) is a vehicle brake force generation device 11 based on the fourth aspect, wherein arrangement may be made such that the brake control section makes the control amount of the regenerative braking caused by the electric motor 13 gradually decrease down to zero and thereafter maintains the state that the control amount is zero.

By the vehicle brake force generation device 11 based on the fifth aspect, the control amount of the control of the regeneration caused by the electric motor 13 is gradually decreased down to zero and the control amount in a state of zero is thereafter maintained. Accordingly, it is possible to further improve the behavior-stabilization performance obtained by the VSA device 18, compared with the above-described operation and advantage of the vehicle brake force generation device 11 based on the fourth aspect.

OTHER EMBODIMENTS

The above-described plural embodiments are examples of embodying the present invention. Accordingly, interpretation of the technical scope of the invention should not be limited thereto. This is because the invention can be carried out in various embodiments without departing from the sprit or the primary features of the invention.

For example, in an embodiment of the invention, slip ratios have been described as an example of one embodiment of slip information representing the tendencies of the wheels 17a-17d to slip, however, the invention is not limited to this example. As another embodiment of slip information, for example, the tendencies of the wheels 17a-17d to slip may be recognized, based on the differences in the rotation speeds between plural wheels 17a-17d and such recognized tendencies to slip may be used as slip information.

Further, an embodiment has been described, taking an example where the vehicle brake force generation device 11 according to the embodiment of the invention is applied to the electric vehicle V provided with only the electric motor 13 as a motion power source, however, the invention is not limited to this example. The invention may be applied to a hybrid vehicle provided with the electric motor 13 and a reciprocating engine as motion power sources.

Further, in an embodiment of the invention, the ABS 47 has been described as an example of a function member having a function to reduce the slip of the wheels 17a-17d, however, the invention is not limited to this example. As a function section having a function to reduce the slip of the wheels 17a-17d, for example, a function member that reduces the slip of the wheels 17a-17d by controlling the brake torque caused by a reciprocating engine brake may be applied to the invention.

The invention claimed is:

1. A vehicle brake force generation device, comprising:
   an electric motor for applying a drive force and a regenerative brake force to a wheel of a vehicle;
   a hydraulic brake pressure generation device for generating a hydraulic brake pressure to be applied to a brake member of the vehicle;
   a slip information computation section for obtaining slip information of the wheel;
   a behavior-stabilization assistance device for performing control of friction braking caused by at least the hydraulic brake pressure generation device so as to reduce slip of the wheel, based on the slip information;
   a diagnosis section for performing diagnosis of the behavior-stabilization assistance device; and
   a brake control section for performing cooperative brake control including at least one of control of regenerative braking caused by the electric motor and the control of the friction braking caused by the hydraulic brake pressure generation device,
   wherein the brake control section maintains a state of the control of the regenerative braking caused by the electric motor when the brake control section has obtained diagnosis information during the cooperative brake control including at least the control of the regenerative braking caused by the electric motor, the diagnosis information representing that the behavior-stabilization assistance device is in an abnormal state.

2. The vehicle brake force generation device according to claim 1, further comprising:
   a drive control section for performing drive control of the electric motor, based on acceleration/deceleration operation information of the vehicle; and
   an information communication medium used in performing information communication between the brake control section and the drive control section, wherein the diagnosis section further has a function to perform abnormality diagnosis of the information communication performed via the information communication medium, and wherein the brake control section maintains the state of the control of the regenerative braking caused by the electric motor when the brake control section has obtained diagnosis information during the cooperative brake control including at least the control of the regenerative braking caused by the electric motor, the diagnosis information representing that information communication on the cooperative brake control performed between the brake control section and the drive control section to reduce the slip of the wheel is abnormal.

3. The vehicle brake force generation device according to claim 1, further comprising:

a drive control section for performing drive control of the electric motor, based on acceleration/deceleration operation information of the vehicle; and an information communication medium used in performing information communication between the brake control section and the drive control section, wherein the diagnosis section further has a function to perform abnormality diagnosis of the information communication performed via the information communication medium, and wherein the brake control section maintains the state of the control of the regenerative braking caused by the electric motor when the brake control section has obtained diagnosis information during the cooperative brake control including at least the control of the regenerative braking caused by the electric motor, the diagnosis information representing that information communication on the cooperative brake control performed between the brake control section and the drive control section to reduce the slip of the wheel is abnormal and representing that the behavior-stabilization assistance device is in an abnormal state.

4. The vehicle brake force generation device according to claim 1, further comprising:

a drive control section for performing drive control of the electric motor, based on acceleration/deceleration operation information of the vehicle; and an information communication medium used in performing information communication between the brake control section and the drive control section, wherein the diagnosis section further has a function to perform abnormality diagnosis of the information communication performed via the information communication medium, and wherein the brake control section gradually decreases a control amount of the regenerative braking caused by of the electric motor when the brake control section has obtained diagnosis information during the cooperative brake control including at least the control of the regenerative braking caused by the electric motor, the diagnosis information representing that the information communication on the cooperative brake control performed between the brake control section and the drive control section to reduce the slip of the wheel is normal and representing that the behavior-stabilization assistance device is in a normal state.

5. The vehicle brake force generation device according to claim 4, wherein the brake control section gradually decreases the control amount of the regenerative braking caused by the electric motor to thereby make the control amount zero, and thereafter maintains a state that the control amount is zero.

* * * * *